July 27, 1954  P. E. MYERS  2,684,744
AIR-COOLED MAGNETIC FRICTION ELEMENT
Filed March 13, 1952  2 Sheets-Sheet 1

INVENTOR
Philip E. Myers
By Carlson, Pitzner, Hubbard & Wolfe
ATTORNEYS

July 27, 1954     P. E. MYERS     2,684,744
AIR-COOLED MAGNETIC FRICTION ELEMENT
Filed March 13, 1952     2 Sheets—Sheet 2
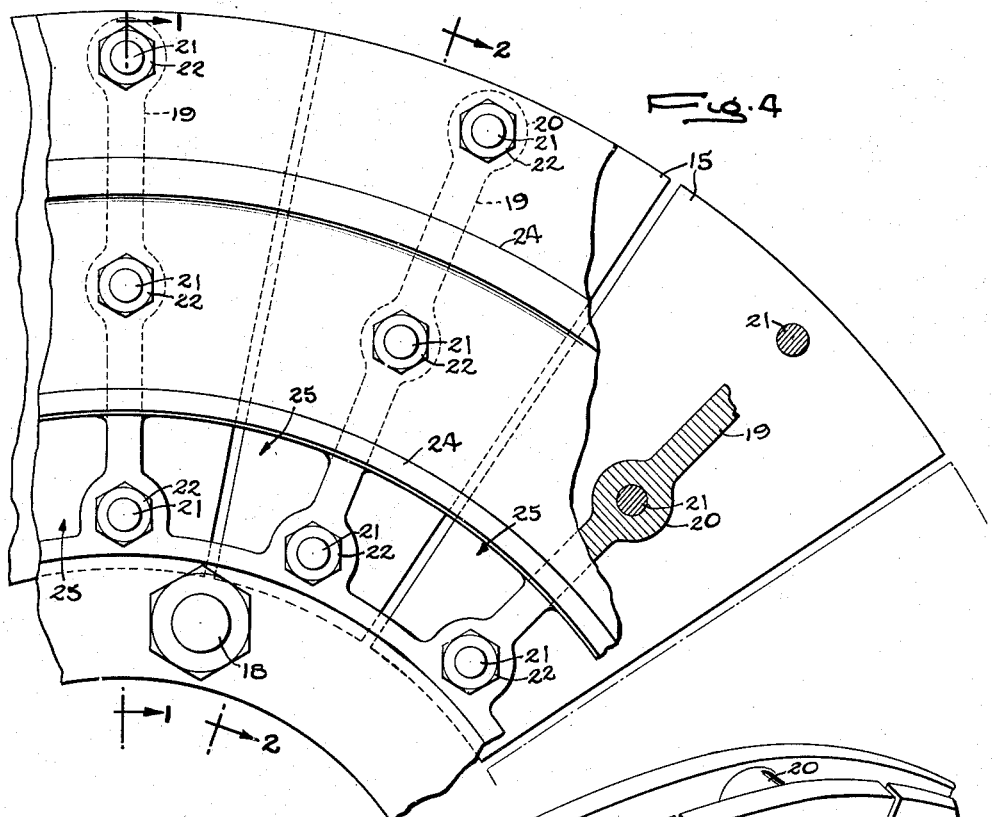
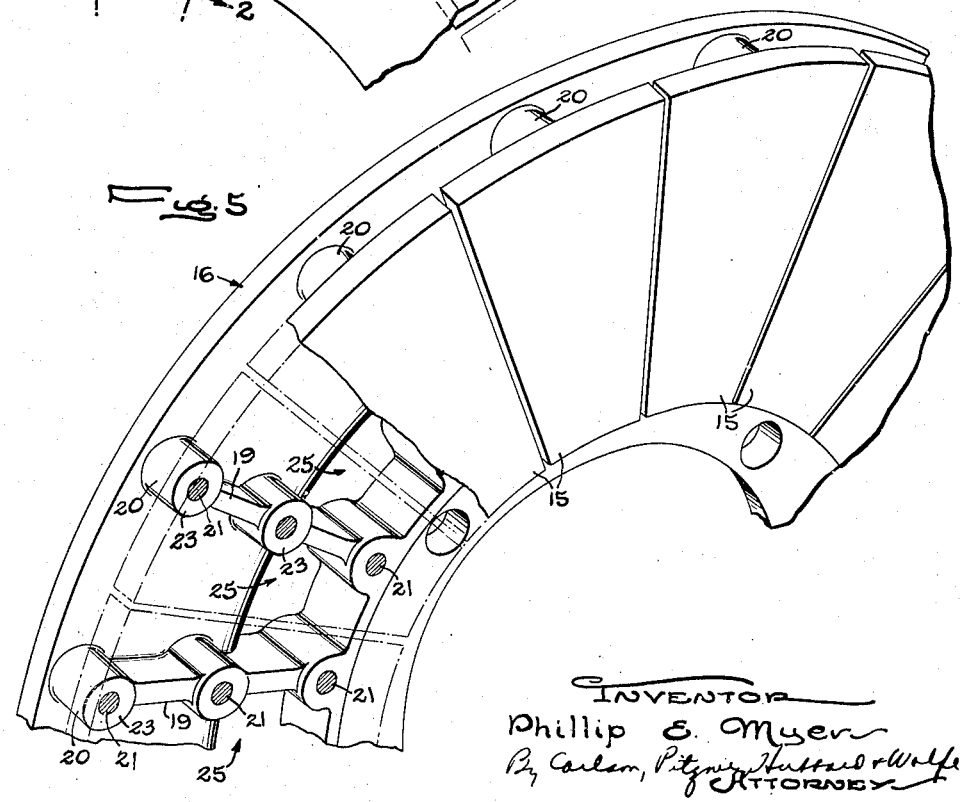

Patented July 27, 1954

2,684,744

UNITED STATES PATENT OFFICE 2,684,744

AIR-COOLED MAGNETIC FRICTION ELEMENT

Philip E. Myers, Beloit, Wis., assignor to Warner Electric Brake & Clutch Company, South Beloit, Ill., a corporation of Illinois Application March 13, 1952, Serial No. 276,407

1 Claim. (Cl. 192—113)

This invention relates to a friction element for use in a brake or clutch of the type in which annular friction rings are brought into axial gripping engagement by energization of a winding on one of the elements. The armature element is preferably composed of an annular series of segments individually attached to a supporting ring so constructed as to induce the flow of cooling air across the segments.

One object of the present invention is to mount the armature segments in a novel manner such as to hold the latter more rigidly against thermal warping, to permit the use of segments of greater radial width without danger of objectionable warping, and to expose a larger area of the segment surfaces directly to the cooling air.

A more detailed object is to construct the segment support as a rigid casting reinforced circumferentially by annular flanges and radially by the narrow ribs to which the individual segments are secured.

Another object is to adapt the magnetic segments for convenient replacement.

Other objects and advantages of the invention will become apparent from the following detailed description taken in connection with the accompanying drawings, in which Figure 1 is a fragmentary diametrical sectional view of a magnetic friction device incorporating the novel features of the present invention, the section being taken along the line 1—1 of Fig. 4.

Fig. 4 is a fragmentary rear elevational view with part of the segment supporting ring broken away.

Fig. 5 is a fragmentary perspective view looking toward the face of the magnetic armature.

Figure 1:
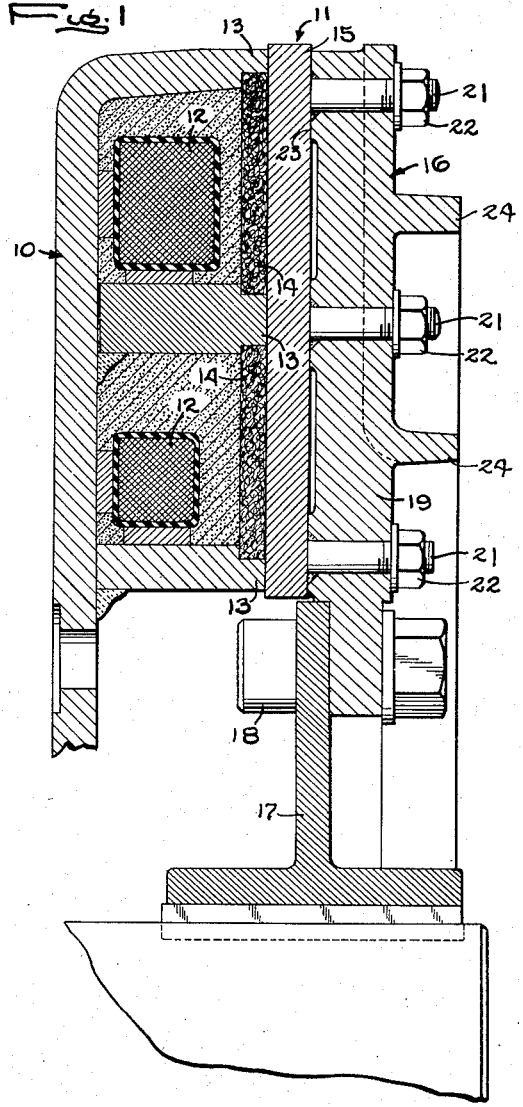
Figure 2:
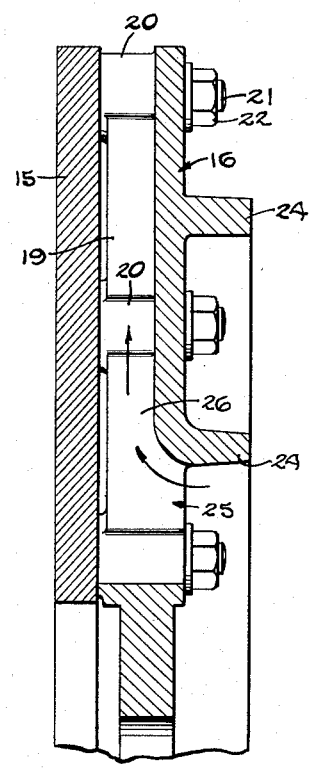
Fig. 2 is a fragmentary section taken along the line 2—2 of Fig. 4.
Figure 3:
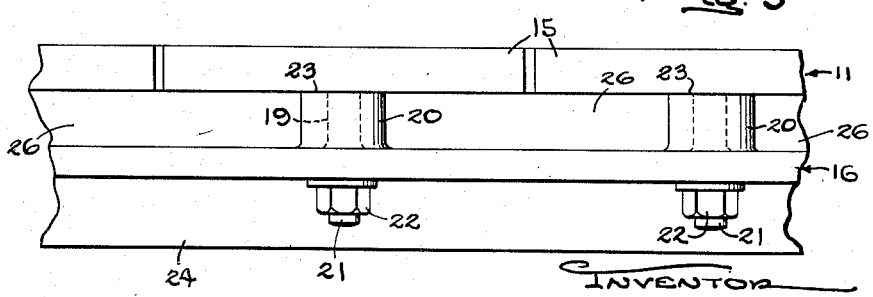
Fig. 3 is a fragmentary development view looking toward the periphery of the friction element shown in Fig. 2.

The invention is shown in the drawings for purposes of illustration incorporated in an electromagnetic friction brake comprising generally an annular magnet 10 suitably secured to a stationary support and a rotary armature 11 adapted to be drawn into axial gripping engagement with the friction face of the magnet upon energization of one or more coils 12 disposed between the magnet poles 13. The end faces of the latter are spanned by the armature and are substantially flush with a friction facing 14 disposed between and supported by the magnet poles.

The armature comprises a series of segmental plates 15 of magnetic material arranged edge to edge around the face of the magnet and individually secured to a supporting disk 16 which, in accordance with the present invention, is an extremely rigid casting and joined to the segments in a novel manner to provide effective cooling and hold the segments against warping in spite of their substantial radial width. The disk proper is substantially flat and somewhat wider than the magnet face so that it may be secured to a rotary support 17 by bolts 18 projecting through holes spaced around the inner periphery of the disk.

Angularly spaced around and projecting from one side of the casting are relatively narrow radial ribs 19 substantially equal in length to the radial width of the segments 15, there being one rib for each segment lying against the back of the latter along the center radius thereof. At their inner and outer ends and at the center the ribs are enlarged to form bosses 20 which are apertured to receive studs 21 integrally joined as by butt welding to the back of the segment. To permit ready removal and replacement of the armature segments 15, the studs are threaded at their free ends and receive nuts 22 which are tightened to clamp the segment against the boss ends 23 which are flush with each other and raised somewhat above the face of the rib 19. Each segment is thus firmly held along its center radius at three widely spaced points.

The ribs 19 effectually reinforce the disk 16 against bending about tangential lines. Reinforcement in a perpendicular direction is effected by radially spaced continuous annular ribs 24 concentric with the disk axis and cast integral with the disk on the back thereof and radially spaced about equidistant from the inner and outer peripheries of the disk. The casting is thus made extremely rigid and will remain substantially flat in spite of the conduction of some frictional heat thereto during heavy duty service of the brake.

The segments, the disk 16, and the ribs 19 are utilized in a novel manner to induce the flow of a large volume of air in close heat exchanging relation to substantially the entire area of the back of the segments so as to quickly dissipate the frictional heat conducted through the segments, and this without the conduction of an objectionable portion of this heat to the supporting disk 16. For this purpose, openings 25 of substantial area are left in the disk 16 immediately within the inner reinforcing rib 24, each opening extending circumferentially substantially the entire distance between the adjacent ribs 19. Each opening 25 thus communicates with the inner end of a radial passage 26 defined by the disk 16, the two adjacent ribs 19, and the back of the segment. Owing to the substantially radial length and cross-sectional area of these passages, a large volume of air will be induced to flow outwardly along the back surface of each segment 15 the entire area of which is exposed except for the mounting surfaces 23 at the ends of the bosses 20. As a result, the supporting disk will be cooled effectually and substantially all of the frictional heat will be absorbed without conduction thereof to the ribs 19 or the disk.

I claim as my invention:

A magnetic friction element comprising a rigid casting in the form of a disk having a series of radial ribs angularly spaced apart and projecting from one side of the disk, each of said ribs having three holes extending therethrough parallel to the disk axis and radially spaced apart over substantially the full width of the disk, radially spaced annular flanges integral with and projecting from the other side of said disk concentric with said axis and respectively spaced inwardly and outwardly from the inner and outer peripheries of said disk, said disk being apertured between said ribs and cooperating with each pair of adjacent ribs to define an outwardly extending open ended channel having an inlet spaced inwardly beyond the inner one of said flanges, flat magnetic segments each lying against one of said ribs, threaded studs integral with the back of each segment and projecting through the holes in the rib, and nuts threading onto said studs and clamping said segments rigidly but removably against said ribs.

References Cited in the file of this patent

UNITED STATES PATENTS

| Number | Name | Date |
|---|---|---|
| 715,111 | Miller | Dec. 2, 1902 |
| 1,987,194 | Kingston | Jan. 8, 1935 |
| 2,241,242 | Friedman | May 6, 1941 |
| 2,437,670 | Adamson | Mar. 16, 1948 |
| 2,554,874 | Oetzel | May 29, 1951 |